US009540261B2

(12) United States Patent
Lin

(10) Patent No.: US 9,540,261 B2
(45) Date of Patent: Jan. 10, 2017

(54) COATED ION EXCHANGE MEMBRANES

(71) Applicants: EVOQUA WATER TECHNOLOGIES LLC, Warrendale, PA (US); Jenny Lin, Bedford, MA (US)

(72) Inventor: Juchui Ray Lin, Bedford, MA (US)

(*) Notice: Subject to any disclaimer, the term of this patent is extended or adjusted under 35 U.S.C. 154(b) by 0 days.

(21) Appl. No.: 14/433,933

(22) PCT Filed: Mar. 15, 2013

(86) PCT No.: PCT/US2013/031993
§ 371 (c)(1),
(2) Date: Apr. 7, 2015

(87) PCT Pub. No.: WO2014/058469
PCT Pub. Date: Apr. 17, 2014

(65) Prior Publication Data
US 2015/0329386 A1 Nov. 19, 2015

Related U.S. Application Data

(60) Provisional application No. 61/712,440, filed on Oct. 11, 2012.

(51) Int. Cl.
| C02F 1/46 | (2006.01) |
| B01D 61/46 | (2006.01) |
| B01D 67/00 | (2006.01) |
| C08J 5/22 | (2006.01) |
| C08J 7/04 | (2006.01) |
| C02F 1/469 | (2006.01) |
| B01D 61/44 | (2006.01) |
| B01D 61/48 | (2006.01) |

(52) U.S. Cl.
CPC ............ *C02F 1/4695* (2013.01); *B01D 61/46* (2013.01); *B01D 67/0088* (2013.01); *C08J 5/2231* (2013.01); *C08J 7/047* (2013.01); *B01D 61/44* (2013.01); *B01D 61/48* (2013.01); *C08J 2333/14* (2013.01); *C08J 2439/08* (2013.01); *C08J 2483/06* (2013.01); *Y02W 10/33* (2015.05); *Y02W 10/37* (2015.05); *Y10T 29/49886* (2015.01)

(58) Field of Classification Search
CPC ..... C02F 1/4695; B01D 61/46; B01D 67/0088
USPC ............................................. 204/632; 521/27
See application file for complete search history.

(56) References Cited

U.S. PATENT DOCUMENTS

| 2,780,604 A | 2/1957 | Clarke et al. |
| 3,009,895 A | 11/1961 | Slocombe |
| 3,549,016 A | 12/1970 | Rigopulos |
| 3,737,045 A | 6/1973 | Hashimoto et al. |
| 3,926,864 A | 12/1975 | Hodgdon, Jr. |
| 4,231,855 A | 11/1980 | Hodgdon et al. |
| 4,297,431 A | 10/1981 | Sullivan |
| 4,585,833 A | 4/1986 | Domeier |
| 4,704,324 A * | 11/1987 | Davis ................ B01D 67/0088 210/500.27 |
| 4,778,601 A | 10/1988 | Lopatin et al. |
| 4,828,772 A | 5/1989 | Lopatin et al. |
| 4,874,567 A | 10/1989 | Lopatin et al. |
| 4,933,405 A | 6/1990 | Evani |
| 5,032,274 A | 7/1991 | Yen et al. |
| 5,039,420 A | 8/1991 | Klein et al. |
| 5,118,717 A | 6/1992 | Hodgdon et al. |
| 5,120,632 A * | 6/1992 | Bertrand ................ G03G 9/09 430/109.3 |
| 5,145,618 A | 9/1992 | MacDonald et al. |
| 5,194,189 A | 3/1993 | Papastavros et al. |
| 5,264,125 A | 11/1993 | MacDonald et al. |
| 5,380,413 A | 1/1995 | Posar et al. |
| 5,401,408 A | 3/1995 | Umemura et al. |
| 5,447,636 A | 9/1995 | Banerjee |
| 5,510,394 A | 4/1996 | Hodgdon |
| 5,714,521 A | 2/1998 | Kedem et al. |
| 5,814,197 A | 9/1998 | Batchelder et al. |
| 5,849,167 A | 12/1998 | Posar |
| 5,868,976 A | 2/1999 | Puglia et al. |
| 5,961,796 A | 10/1999 | Hitchens et al. |
| 6,013,724 A * | 1/2000 | Mizutani ................ C09D 183/02 106/15.05 |
| 6,117,297 A | 9/2000 | Goldstein |
| 6,217,733 B1 | 4/2001 | Hurwitz et al. |
| 6,221,248 B1 | 4/2001 | Lin et al. |
| 6,258,276 B1 | 7/2001 | Mika et al. |
| 6,277,512 B1 | 8/2001 | Hamrock et al. |
| 6,344,584 B2 | 2/2002 | Lin et al. |
| 6,410,672 B1 | 6/2002 | MacDonald et al. |
| 6,423,205 B1 | 7/2002 | Akahori et al. |
| 6,596,137 B2 | 7/2003 | Nago et al. |
| 6,723,758 B2 | 4/2004 | Stone et al. |
| 6,814,865 B1 | 11/2004 | Aminabhavi et al. |
| 6,828,386 B2 | 12/2004 | MacKinnon |
| 6,830,671 B2 | 12/2004 | Aritomi et al. |

FOREIGN PATENT DOCUMENTS

| CN | 1114237 A | 1/1996 |
| CN | 1986613 A | 6/2007 |

(Continued)

OTHER PUBLICATIONS

J.C. Salamone et al: "Polymerization of Vinylpyridinium Salts. XIII. Preparation of CVinyl-N-Methylpyridinium pStyrenesulfonate Charge Transfer Ion-Pair Comonomer", Dec. 31, 1985 (Dec. 31, 1985), XP055104794, Retrieved from the Internet: URL:http://onlinelibrary.wiley.com/store/10.1002/pol.1985.130231210/asset/130231210_ftp.pdf?v-1&t-hs6a53wy&s-e4772bb8729b1774cd920c40734d5b18cad056d1 [retrieved on Feb. 27, 2014] *p. 656, paragraph 7* *p. 658, paragraph 3*.

(Continued)

*Primary Examiner* — Michael M Bernshteyn

(57) ABSTRACT

Ion exchange membranes may include a polymeric microporous substrate, a cross-linked ion transferring polymeric layer on the substrate, and a hydrophobic coating on the cross-linked ion transferring polymer. The hydrophobic coating may comprise at least one of a weak base copolymer and an organosilicate compound.

20 Claims, 3 Drawing Sheets

(56) References Cited

U.S. PATENT DOCUMENTS

| | | |
|---|---|---|
| 6,849,688 B2 | 2/2005 | Hellums |
| 6,851,561 B2 | 2/2005 | Wu et al. |
| 6,924,318 B2 | 8/2005 | Mischi et al. |
| 7,081,484 B2 | 7/2006 | Sugaya et al. |
| 7,087,654 B2 | 8/2006 | MacDonald et al. |
| 7,201,832 B2 | 4/2007 | Yamanaka et al. |
| 7,247,370 B2 | 7/2007 | Childs et al. |
| 7,316,919 B2 | 1/2008 | Childs et al. |
| 7,318,972 B2 | 1/2008 | Highgate |
| 7,368,200 B2 | 5/2008 | Zhu et al. |
| 7,396,465 B2 | 7/2008 | Wu et al. |
| 7,425,583 B2 | 9/2008 | Inoue et al. |
| 7,449,111 B2 | 11/2008 | Hedhli et al. |
| 7,514,481 B2 | 4/2009 | Yandrasits et al. |
| 7,544,278 B2 | 6/2009 | Aminabhavi et al. |
| 7,632,406 B2 | 12/2009 | Wilson et al. |
| 7,649,025 B2 | 1/2010 | Kitamura et al. |
| 7,674,505 B2 | 3/2010 | Kerres et al. |
| 7,740,967 B2 | 6/2010 | Oren et al. |
| 7,790,837 B2 | 9/2010 | McGrath et al. |
| 7,829,218 B2 | 11/2010 | Endo et al. |
| 7,833,644 B2 | 11/2010 | Chokai et al. |
| 7,868,124 B2 | 1/2011 | Balland-Longeau et al. |
| 7,888,397 B1 | 2/2011 | Hibbs et al. |
| 7,893,303 B2 | 2/2011 | Yamakawa et al. |
| 7,901,831 B2 | 3/2011 | Brunea |
| 7,910,236 B2 | 3/2011 | Hommura et al. |
| 7,923,166 B2 | 4/2011 | Fukuta et al. |
| 7,931,995 B2 | 4/2011 | Bahar et al. |
| 7,938,941 B2 | 5/2011 | Kashiwada et al. |
| 7,947,196 B2 | 5/2011 | Lee et al. |
| 7,959,780 B2 | 6/2011 | Hawkins et al. |
| 7,968,663 B2 | 6/2011 | MacDonald et al. |
| 7,977,392 B2 | 7/2011 | MacKinnon et al. |
| 8,075,951 B2 | 12/2011 | Hammond-Cunningham et al. |
| 8,114,550 B2 | 2/2012 | Suzuki et al. |
| 8,349,155 B2 | 1/2013 | Umemura et al. |
| 8,367,267 B2 | 2/2013 | Frey et al. |
| 8,703,831 B2 | 4/2014 | Lin et al. |
| 8,969,424 B2 | 3/2015 | Lin |
| 9,023,902 B2 | 5/2015 | Lin et al. |
| 2002/0019448 A1 | 2/2002 | Sugaya et al. |
| 2002/0045085 A1 | 4/2002 | Formato et al. |
| 2003/0024816 A1 | 2/2003 | Aritomi et al. |
| 2003/0105173 A1 | 6/2003 | Sugaya et al. |
| 2004/0175625 A1 | 9/2004 | Hedhli et al. |
| 2004/0241518 A1 | 12/2004 | Yang |
| 2005/0011826 A1 | 1/2005 | Childs et al. |
| 2005/0250919 A1 | 11/2005 | Caneba et al. |
| 2006/0000778 A1 | 1/2006 | Childs et al. |
| 2006/0045985 A1 | 3/2006 | Kozak |
| 2007/0020499 A1 | 1/2007 | Suzuki et al. |
| 2007/0031716 A1 | 2/2007 | Rajendran |
| 2007/0261962 A1 | 11/2007 | Gajek |
| 2008/0023334 A1 | 1/2008 | Nakagawa et al. |
| 2008/0223785 A1 | 9/2008 | Miller et al. |
| 2009/0137757 A1 | 5/2009 | Imuta et al. |
| 2009/0155370 A1 | 6/2009 | Cope et al. |
| 2010/0056650 A1* | 3/2010 | Highgate ............ B01D 67/0006 521/27 |
| 2010/0062313 A1 | 3/2010 | Browning et al. |
| 2010/0065490 A1 | 3/2010 | Balster et al. |
| 2010/0239946 A1 | 9/2010 | Miyachi et al. |
| 2011/0020730 A1 | 1/2011 | Mizuno et al. |
| 2011/0068002 A1* | 3/2011 | Lin ....................... B01D 61/44 204/296 |
| 2011/0097645 A1 | 4/2011 | Van Baak et al. |
| 2011/0132762 A1 | 6/2011 | O'Brien et al. |
| 2011/0147308 A1 | 6/2011 | Johnston-Hall et al. |
| 2011/0189585 A1 | 8/2011 | Brunea |
| 2011/0200907 A1 | 8/2011 | Moon et al. |
| 2011/0203990 A1 | 8/2011 | Murphy et al. |
| 2011/0224314 A1 | 9/2011 | MacDonald et al. |
| 2011/0281197 A1 | 11/2011 | Daikoku et al. |
| 2011/0290727 A1 | 12/2011 | Van Engelen |
| 2012/0006685 A1 | 1/2012 | Van Engelen |
| 2012/0014858 A1* | 1/2012 | Rowell ................. C01B 33/141 423/326 |
| 2012/0024697 A1 | 2/2012 | Antheunis et al. |
| 2012/0031834 A1 | 2/2012 | Higa et al. |
| 2012/0035280 A1 | 2/2012 | Jikihara et al. |
| 2012/0248028 A1 | 10/2012 | Antheunis et al. |
| 2012/0248029 A1 | 10/2012 | Antheunis et al. |
| 2012/0248030 A1 | 10/2012 | Antheunis et al. |
| 2012/0248032 A1 | 10/2012 | Van Berchum et al. |
| 2012/0329891 A1 | 12/2012 | Lee et al. |

FOREIGN PATENT DOCUMENTS

| | | |
|---|---|---|
| JP | S63-503074 A | 11/1988 |
| JP | 2000-503898 A | 4/2000 |
| JP | 2001-157823 A | 6/2001 |
| JP | 2005-334263 A | 12/2005 |
| JP | 2006-519273 A | 8/2006 |
| JP | 2008119608 A | 5/2008 |
| JP | 2008-255351 A | 10/2008 |
| JP | 2008288065 A | 11/2008 |
| JP | 2009144041 A | 7/2009 |
| JP | 2009-173786 A | 8/2009 |
| JP | 2009-173828 A | 8/2009 |
| JP | 2009-215499 A | 9/2009 |
| JP | 2009-215500 A | 9/2009 |
| WO | 0193361 A2 | 12/2001 |
| WO | 03008078 A2 | 1/2003 |
| WO | 2004073843 A1 | 9/2004 |
| WO | 2005102503 A1 | 11/2005 |
| WO | 2010007399 A1 | 1/2010 |
| WO | 2010013861 A1 | 2/2010 |
| WO | 2010106356 A1 | 9/2010 |
| WO | 2010106357 A1 | 9/2010 |
| WO | 2011025867 A1 | 3/2011 |
| WO | 2012051608 A1 | 4/2012 |
| WO | 2012051610 A1 | 4/2012 |
| WO | 2012081026 A2 | 6/2012 |
| WO | 2013014420 A1 | 1/2013 |
| WO | 2013052227 A1 | 4/2013 |

OTHER PUBLICATIONS

Pandey, Ashok K. et al., "Formation of Pore-Filled Ion-Exchange Membranes within Situ Crosslinking: Poly (Vinylbenzyl Ammonium Salt)-Filled Membranes", Journal of Polymer Science Part A: Polymer Chemistry, vol. 39, No. 6, Mar. 15, 2001.

* cited by examiner

COATED ION EXCHANGE MEMBRANES

CROSS-REFERENCE TO RELATED APPLICATIONS

This application is a U.S. National Stage Application under 35 U.S.C. §371 of International PCT Application Serial No. PCT/US2013/031993 filed on Mar. 15, 2013, titled "COATED ION EXCHANGE MEMBRANES," which claims priority under 35 U.S.C. §119(e) to U.S. Provisional Patent Application Ser. No. 61/712,440, filed on Oct. 11, 2012, titled "COATED ION EXCHANGE MEMBRANES."

FIELD OF THE TECHNOLOGY

Aspects relate to ion exchange membranes having enhanced properties and to processes of making ion exchange membranes having said properties.

SUMMARY

In accordance with one or more aspects, an ion exchange membrane may comprise a polymeric microporous substrate, a cross-linked ion transferring polymeric layer on the substrate, and a hydrophobic coating on the cross-linked ion transferring polymer, the hydrophobic coating comprising at least one of a weak base copolymer and an organosilicate compound.

In accordance with one or more aspects, a method of reducing water loss in an electrochemical separation device comprising at least one ion exchange membrane may involve coating the at least one ion exchange membrane with a weak base copolymer or an organosilicate compound, and integrating the at least one coated ion exchange membrane into the electrochemical separation device.

In accordance with one or more aspects, a water treatment system may comprise an electrochemical separation device including at least one ion exchange membrane coated with a hydrophobic weak base copolymer or a hydrophobic organosilicate compound.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
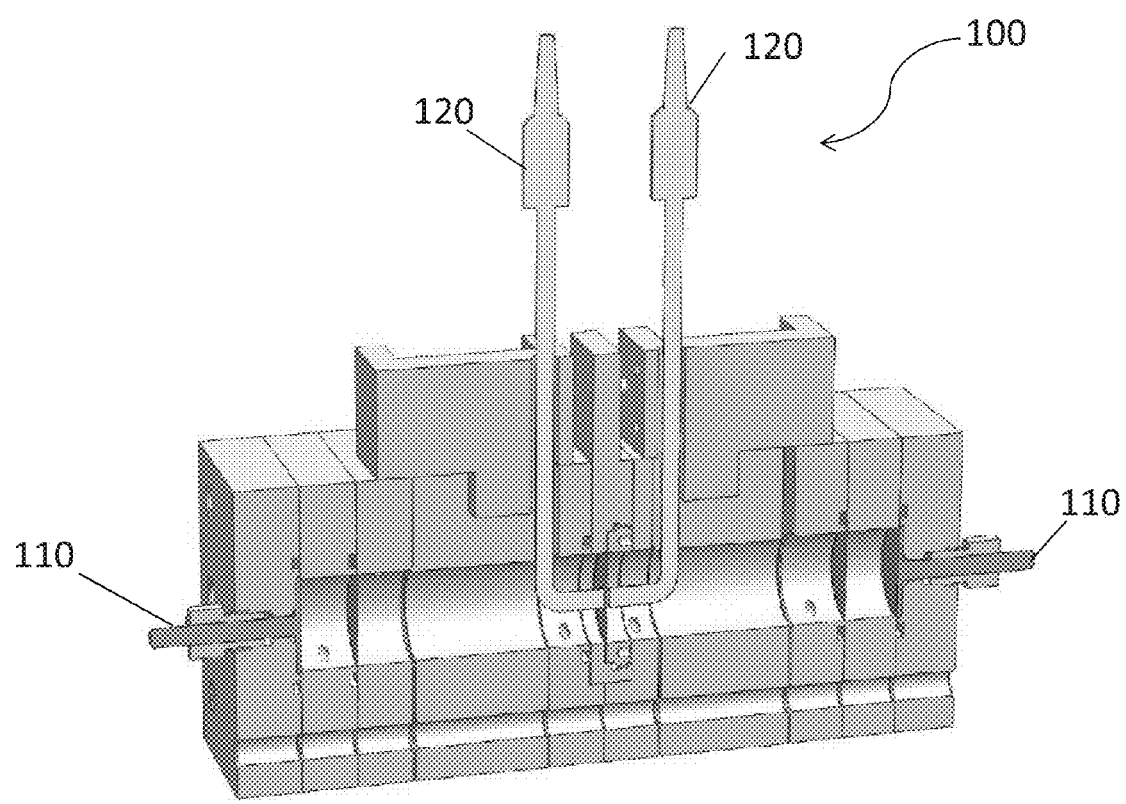
FIG. 1 presents an electrochemical test unit used.

Devices for purifying fluids using electrical fields are commonly used to treat water and other liquids containing dissolved ionic species. Two types of devices that treat water in this way are electrodeionization and electrodialysis devices. Within these devices are concentrating and diluting compartments separated by ion exchange membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semipermeable or selectively permeable ion exchange or bipolar membranes.

Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to electrodialysis (ED) and electrodeionization (EDI) devices. Commercially available ED devices are typically of plate-and-frame design, While EDI devices are available in both plate and frame and spiral configurations.

One or more embodiments relate to the composition of ion exchange membranes that may be used in devices that purify fluids electrically, as well as methods of manufacture and use thereof.

Electrochemical separation systems are used to create ultrapure water for the pharmaceutical and semiconductor industries, are used as power generating sources in reverse electrodialysis, as separators in fuel cells, are used in the recovery of metal ions in the electroplating and metal finishing industries, are in various other applications including the food and beverage industry. Among the most important applications of ion exchange membranes, however, is the desalination of seawater by electrochemical methods.

Seawater is traditionally desalinated by pressure driven methods, and is most commonly accomplished by reverse osmosis. Seawater reverse osmosis however requires extensive pre-treatment of the feed and is an energy-intensive process. Electrochemical desalination has advantages over reverse osmosis in that less pretreatment is required. Though electrochemical methods are often used to treat brackish and waste water, electrochemical methods are still often considered too expensive for seawater desalination.

Seawater has a total dissolved solids content of about 35,000 parts per million (ppm). The majority of the dissolved solids in seawater is sodium chloride, and thus treating seawater predominantly involves removing monovalent ions. Reverse osmosis membranes, however, generally, preferentially remove divalent ions and thus are less efficient at treating seawater than membranes that selectively remove monovalent ions. Electrochemical desalination may have advantages over reverse osmosis desalination because monovalent selective membranes can be used to treat seawater.

Ion exchange membranes can be fabricated to be ion selective. For example, a membrane can be fabricated from a specific precursor such that the resulting membrane preferentially removes a certain ion from a treatment water. Certain industries require water with a particularly low concentration of a specific ion. For example, water flooding used in the oil refinery business must have very low sulfate values, and the semiconductor and pharmaceutical industries require ultra pure water having very low concentrations of boron and silica. The fabrication of ion-selective membranes is thus highly desirable because of their ability to efficiently remove species of interest contained in a treatment water for use in a specific application.

The design of a successful and economical electrochemical separation system, including an electrochemical system for desalinating seawater, is affected by a number of parameters, including the ion selectivity of the membranes, but most importantly, the voltage drop across a pair of ion exchange membranes and the electric power consumed in the desalting process. The properties of the ion exchange membranes used in such systems impact the system efficiency. The development of ion exchange membranes requires an optimization of properties in order to overcome competing effects. Ion exchange membranes for seawater desalination generally must meet four main characteristics to be considered successful. The membranes must have low electrical resistance, high permselectivity, high chemical stability, and good mechanical strength. Of these parameters, low electrical resistance and high permselectivity are of the most importance because they directly affect the energy consumption of an electrochemical separation process.

The electrical resistivity of an ion exchange membrane is an expression of how strongly the membrane resists the flow of electric current. When resistivity is high, more current, and thus more energy, must be applied to the electrochemical cell to facilitate ion transfer across the membrane to perform electrochemical separation. Thus generally, the lower the resistivity of the ion exchange membrane, the more efficient the membrane, and system having said membrane, can perform electrochemical separations. Membrane resistivity is generally expressed in units of resistance by area, for example, ohm-square centimeters, $\Omega \cdot cm^2$.

The permselectivity measures the degree to which a membrane is permeable to counter-ions and impermeable to co-ions. When an electric current is applied to an electrochemical cell having an anion exchange membrane and a cation exchange membrane, specifically referring to the cation exchange membrane for explanative purposes, counter-ions (cations) in solution will cross the cation membrane and theoretically, co-ions (anions) will be rejected by the membrane. In practice however, some anions will cross the cation exchange membrane. The passage of these co-ions across the membrane reduces the overall process efficiency. Thus membranes that have a high permselectivity, that is, are highly permeable to counter-ions and highly impermeable to co-ions, are more efficient than membranes having lower permselectivity.

Seawater desalination generally causes membranes to foul. Ion exchange membranes used in seawater desalination must be able to withstand cleaning by oxidative chemicals, and therefore must also be able to withstand pHs in a range of from about 0 to about 14, for example, a pH in the range of about 2 to about 12. The membranes must also be able to withstand the stress of being handled while being manufactured into modules or other processing devices. The membrane must also have good dimensional stability in operation. Seawater feed can vary in temperature and concentration and the membrane should not swell or shrink excessively when the properties of fluid contacting the membrane change.

In order to be competitive with seawater reverse osmosis desalination, an electrochemical apparatus, such as an ED or EDR, must have membranes with a resistance of less than about 1 ohm-$cm^2$ preferably less than 0.8 ohm-$cm^2$, and most preferably, less than about 0.5 ohm-$cm^2$. Further, the ion permselectivity must be greater than about 90%, more preferably greater than about 95%, and most preferably, greater than about 98%.

The membrane must also have a long service life, be physically strong and chemically durable, and it must be capable of fabrication at low cost. Though thinner membranes will have lower resistance and allow for more membrane area per unit volume of a device, thinner membranes are more susceptible to dimension changes from environmental effects, such as changes in the temperature and concentration of the solution contacting the membrane. Moreover, the development and production of defect-free thinner membranes is more difficult than when a relatively greater thickness is allowed because production of thinner membranes reduces the available margin of error during membrane production.

Ion exchange membranes comprise polymeric materials that facilitate the transport of either positive or negative ions across the membrane. Ion exchange membrane properties, including resistivity and permselectivity, are controlled, in part, by the amount, type, and distribution of fixed ionic groups in the membrane. For example, strong base anion exchange membranes generally comprise quaternary ammonium salts, where as weak base anion exchange membranes generally comprise tertiary amines. The ammonium ylides have fixed positive charges that allow anionic species to permeate across the membrane.

Commercially available ion exchange membranes are generally heterogenous membranes. Heterogenous membranes comprise a polymeric layer coated on top of a film and are fabricated by a multi-step process that involves calendaring neutral polymers, a binder, and a plasticizer onto a reinforcing monofilament, such as a woven fabric, at a high temperature and pressure. The calendared monofilament film is then functionalized in a batch process. The polymer coated on the film undergoes a reaction that creates fixed charges in the resulting membrane. For the fabrication of cation exchange membranes, the coated films undergo a batch process to sulfonate the polymer coating. For the fabrication of anion exchange members, the coated film undergoes a process that chloromethylates the polymer coating.

The functionalization step is time consuming, and may take longer than a day, longer than two days, or longer than three days to complete. After functionalization is complete, the membranes are thoroughly washed and rinsed of excess sulfonating, in the case of cation exchange, and chlormethylation in the case of anion exchange, agents. The solvents used to wash the membranes are costly and may be carcinogenic or otherwise hazardous and therefore the rinsing process requires both good ventilation and a solvent recovery process.

Other classes of commercially available ion exchange membranes involve disposing an ion exchange functionalized thermoplastic polymer solution on a releasing surface with, or without, reinforced supporting substrates. The functionalization of ion exchange thermoplastics, such as polysulfone, poly(ether-ether ketone), poly(phenylene oxide), and fluorinated polymers requires multiple steps, is tedious, can result in low yields. Membranes made with this technique generally have low permselectivity and are expensive. Further, because the polymer is not crosslinked, the membranes experience a greater degree of dimensional change when exposed to high salinity gradients during separation processes.

Commercially available membranes are therefore expensive, and the installation of commercially available membranes may be cost-prohibitive and inefficient for large scale commercial desalination installations.

Membranes fabricated by these multi-step processes often have a thickness of about 150 μm to about 200 μm, depending on the type of membrane fabricated. Thicker membranes may be fabricated by using powdered ion exchange resin beads in a hot blending process with a polyethylene binder. The blended polymeric compound is extruded onto a film. Membranes fabricated by coating a film by extrusion have a typical thickness of about 300 μm to about 500 μm. These membranes are also expensive, and their thickness is undesirable for the installation of large scale desalination processes.

In accordance with aspects and embodiments, a homogenous ion exchange membrane and process of fabricating a homogenous ion exchange membrane is disclosed. The fabrication process of the present invention may be a one step process. The process may enable ion exchange membranes to be produced in large quantities, in shorter time periods, and at lower cost.

In accordance with embodiments, reactive monomers may be used to fill the pores of a polymeric microporous substrate. The pore-filling process may be a one step process and may produce membranes having enhanced electrical properties as compared to commercially available membranes. The membranes of the present invention may have a lower area resistivity, and higher permselectivity than commercially available membranes. Heterogeneous membranes generally suffer from variations and inconsistencies in electrochemical properties. The process and membranes of the present disclosure may have a more uniform microstructure and may thus provide a higher degree of consistency in the electrochemical properties of like-fabricated membranes. The membranes of the present disclosure may have a permselectivity of greater than about 95% and an area resistivity of less than about 1.5 $\Omega \cdot cm^2$.

Commercially available membranes are not generally weldable and typically must be kept wet at all times, which makes installation of the ion exchange membranes in an electrochemical device and operation of the device difficult. In accordance with aspects and embodiments, a thermally weldable membrane is provided that can be dried out, re-wet, and re-used. The membranes of the present disclosure may also be thinner than commercially available membranes and may, for example, have a thickness of less than about 255 µm, less than about 155 µm, less than about 55 µm, and in some embodiments, the membrane may have a thickness of about 20 µm. Thus, the membranes disclosed may allow packing of a larger effective membrane area in a smaller space than would be achievable by commercially available membranes. The membranes of the present disclosure may thus be used to design electrochemical devices having increased productivity. The membranes of the present invention may allow for more versatile product design.

In accordance with aspects and embodiments, a homogenous ion exchange membrane is produced having improved electrochemical properties. The homogenous ion exchange membrane may be produced by the polymerization of monomers. A polymeric microporous substrate may be soaked in a monomer mixture. Typically, when a polymeric microporous substrate is used to fabricate an ion exchange membrane, a polymer mixture coats the substrate. The pores of the substrate may not be filled by the polymers in the mix because the polymers in the mixture have a size much greater than the size of the substrate pores. In accordance with aspects and embodiments, the pores of a polymeric microporous support may be filled by reactive monomers and the pore-filled substrate may be used to produce an ion exchange membrane. Anion exchange membranes may, for example, be fabricated from a substrate filled with a vinylimidazole monomer, such that when the monomer filling the pores is polymerized to form a membrane, the polymerized product comprises fixed charge quaternary amine groups that function as active sites for anion exchange. Cation exchange membranes, may, for example, be fabricated from a substrate filled with a sulfoethyl methacrylate monomer, such that when the monomer filling the pores is polymerized to form a cation exchange membrane, the polymerization product comprises fixed sulfonic acid groups that provide active sites for cation exchange.

The monomers, however, that polymerize to polymers containing fixed charges are generally hydrophilic. Thus, if a monomeric precursor containing quaternary ammonium salt was homo-polymerized to produce an anion exchange membrane, the ammonium ylides groups that facilitate the exchange of anions, would ultimately leach out of the membrane during membrane conditioning or when exposed to treatment solutions. If the polymers having active sites leach out of the membrane, the electrochemical performance of the membrane declines. When preparing ion exchange membranes from monomers, it is thus necessary to polymerize the functional monomer with a cross-linking agent that renders the polymerized product of the functional monomer less hydrophilic. As used herein, a functional monomer is a monomer than can be polymerized to have a fixed charge suitable to function as an active site in an ion exchange membrane. As used herein, a cross-linking agent, or cross-linking monomer, is any monomer capable of copolymerizing with the functional monomer to render the polymerization product less hydrophilic.

In accordance with aspects and embodiments, ion exchange membranes may thus be prepared by the free radical polymerization of two monomers, the functional monomer and the cross-linking monomer. Free radical reactions are difficult to control, however, and often result in inconsistent products. For example, when preparing ion exchange membranes, the hydrophilic and hydrophobic ingredients may separate over time or in response to temperature changes, the mix may turn cloudy, or may prematurely set. Further, run-away reactions may occur, which can lead to safety hazards and loss of time and material.

Other problems associated with controlling free radical polymerization reactions include the homo-polymerization of the water soluble functional monomer, the homo-polymerization of the cross-linking monomer, and low conversion of copolymerization. Low conversion of polymerization leaves a portion of incompletely polymerized monomers, dimers, and oligomers. The homo-polymerized functional monomers and incompletely polymerized monomers, dimers, and oligomers may leach out during the ion exchange membrane conditioning process and may negatively impact the electrochemical performance of the membranes. Area-resistivity may increase and permselectivity may decrease.

In accordance with aspects of the present disclosure, monomers for the fabrication of ion exchange membranes may be selected based on their reactivity ratios. Selecting monomers based on their reactivity ratios may facilitate controlling polymerization reactions and the process of selecting monomers based on their reactivity ratios may enable the fabrication of membranes having enhanced electrochemical properties.

The efficiency of a free radical polymerization of copolymers can be calculated by the mole ratios of the starting monomers to determine their theoretical ion exchange capacities as compared to the experimentally measured properties of a fabricated ion exchange membrane. The measured efficiencies of copolymerization reactions can be used to modify reaction mixtures and fabricate membranes with improved properties.

The properties of fabricated membranes can be measured by ion exchange capacity tests and by spectroscopic analytical methods, such as FTIR, FT-UV, FT-Raman, or NMR spectroscopy. Monomer sequence distributions in a copolymer can often be determined and classified by spectroscopic methods.

The reactivity ratio of two polymers can be determined by comparing the composition of the initially formed copolymer and the initial mixture of monomers. The reactivity ratio of a vinyl monomer copolymerizing with a second monomer is defined by:

$$m_1/m_2 = [M_1(r_1M_1+M_2)]/[M_2(r_2M_2+M_1)]$$

where $m_1$=the mole of monomer 1 entering the copolymer, $m_2$=the mole of monomer 2 entering the copolymer; $M_1$=the mole of monomer 1 in the monomer mix, $M_2$=the mole of monomer 2 in the monomer mix, and $r_1$, and $r_2$ are the monomer reactivity ratios.

The behavior of monomers in copolymerization reactions is especially useful for analyzing the effect of chemical structure on reactivity. Copolymerization reactions facilitate the fabrication of polymer products with specifically desired properties. Homo-polymerization of single monomers cannot produce a wide range of products. Copolymerization, however, provides for the synthesis of a near unlimited number of different products. By varying the nature and relative amounts of two monomer units, a wide variety of copolymers can be produced from a binary monomer combination.

Copolymerization reactions can produce four distinct types of polymers; random, block, alternative, and graft. Spectroscopic analysis can be used to identify the copolymer that results from a copolymerization reaction.

```
Random ~AABABBBABABBAAABABBAAAAB~
Block  ~AAAAAAAAAAAABBBBBBBBBBBB~
Alternative ~ABABABABABABABABABABABAB~
Graft ~A-A-A-A-A-A-A-A-A-A-A~
            |
            B
            B
            B
            B
```

The Mayo-Lewis copolymerization equations shown below for a two monomer system leads to two types of propagating species—one with $M_1$ at the propagating end and the other with $M_2$ at the propagating end. These can be represented by $M_1^*$ and $M_2^*$, where the asterisk represents the radical as the propagating species.

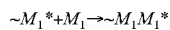 $\quad k_{11}$

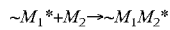 $\quad k_{12}$

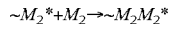 $\quad k_{22}$

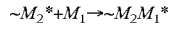 $\quad k_{21}$

The monomer reactivity ratios, $r_1$ and $r_2$, for any monomer pair are the ratios of the rate constants of the different propagation reactions:

$$r_1 = k_{11}/k_{12}$$

$$r_2 = k_{22}/k_{21}$$

From these equations, several limiting cases can be derived:
- $r_1 = r_2 \gg 1$: both reactivity ratios very high, the two monomers have no inclination to react to each other except with themselves leading to a mixture of two homo-polymers.
- $r_1 = r_2 > 1$: both ratios larger than 1, homo-polymerization of component M_1 is favored but in the event of a cross polymerization by M_2 the chain-end will continue as such giving rise to block copolymer.
- $r_1 = r_2 \approx 1$: both ratios around 1, monomer 1 will react as fast with another monomer 1 or monomer 2 and a random copolymer results.
- $r_1 = r_2 \approx 0$: both values approaching 0 the monomers are unable to react in homo-polymerization and the result is an alternating polymer.
- $r_1 \gg r_2 \gg 1$: In the initial stage of the copolymerization monomer 1 is incorporated faster and the copolymer is rich in monomer 1. When this monomer gets depleted, more monomer 2 segments are added. This is called composition drift.

TABLE 1

Reactivity Ratio of copolymers from binary monomer system.
(Excerpt from Polymer Handbook, 3$^{rd}$ Ed. pages 153-226)

| Monomer | Monomer 2 | $r_1$ | $r_2$ |
|---|---|---|---|
| 2-Sulfoethyl methacrylate | Styrene | 0.60 | 0.37 |
| 2-Sulfoethyl methacrylate | Ethyl methacrylate | 2.0 | 1.0 |
| 2-Sulfoethyl methacrylate | Ethyl acrylate | 3.2 | 0.3 |
| Methyl acrylate | Sodium (2-Sulfoethyl methacrylate) | 0.78 | 1.20 |
| Styrene | Acrylic acid | 0.253 | 0.136 |
| Styrene | methyl methacrylate | 0.49 | 0.48 |
| Styrene | 1-vinylimidazole | 9.94 | 0.071 |
| Styrene | 2-Sulfoethyl methacrylate | 0.37 | 0.60 |
| Styrene | 2-Hydroxyethylmethacrylate | 0.44 | 0.54 |
| Styrene | Ethyleneglycol dimethacrylate | 0.28 | 0.98 |
| Styrene | p-Divinyl benzene | 0.26 | 1.18 |
| Styrene | m-Divinyl benzene | 0.65 | 0.60 |
| styrene | Glycidyl methacrylate | 0.54 | 0.16 |
| Styrene | N-vinylcarbazole | 6.0 | 0 |
| Styrene | p-chloromethylstyrene | 0.62 | 1.12 |
| Styrene | N-Methyl-3-vinylcabazole | 0.735 | 1.404 |
| Styrene | 2-vinylpyridine | 0.46 | 0.75 |
| Styrene | 4-vinylpyridine | 0 | 1.04 |
| 2-Hydroxyethyl-methacrylate | 2-acrylamido-2-methylpropanesulfonic acid | 0.86 | 0.90 |
| 2-Hydroxyethyl-methacrylate | 2-vinylpyridine | 0.56 | 0.64 |
| 2-Hydroxyethyl-methacrylate | 3-vinylpyridine | 0.69 | 0.73 |
| 2-Hydroxyethyl-methacrylate | 4-vinylpyridine | 0.62 | 0.90 |
| 2-Hydroxyethyl-methacrylate | Methylmethacrylate | 0.63 | 0.83 |
| Methylmethacrylate | 4-vinylpyridine | 0.54 | 0.99 |
| Methylmethacrylate | Ethyleneglycol dimethacrylate | 1.8635 | 0.6993 |
| Sodium styrenesulfonate | Acrolein | 0.047 | 0.260 |
| Sodium styrenesulfonate | α-chloro-acrylate, sodium salt | 1.44 | 0.27 |
| Vinylidene dichloride | N-vinylcarbazole | 0 | 3.6 |
| Vinylidene dichloride | 2-Sulfoethylmethacrylate | 0.22 | 3.6 |
| Vinylidene dichloride | Methacrylic acid | 0.154 | 3.368 |
| Butyl acrylate | Styrene, p-octylamine sulfonate | 0.30 | 2.30 |
| Butyl acrylate | 2-vinylpyridine | 0.11 | 2.59 |
| Butyl acrylate | 4-vinylpyridine | 0.23 | 4.30 |
| Methacrylic Acid | Diethylaminoethylmethacrylate | 0.63 | 2.34 |
| 2-acrylamide-2-methylpropane-sulfonic acid | N,N-dimethyl acrylamide | 0.590 | 1.108 |
| Sodium, 2-acrylamido-2-methylpropane-sulfonate | Vinyl acetate | 11.60 | 0.05 |
| Sodium, 2-acrylamido-2-methylpropane-sulfonate | 2-Hydroxypropyl methacrylate | 1.03 | 0.89 |
| Ethyl acrylate | N-vinylcarbazole | 1.10 | 0.27 |
| Ethyl acrylate | 1,3-divinylimidazolid-2-one | 0.41 | 0 |
| Ethyl acrylate | 1-ethyl-3-vinyl imidazolid-2-one | 0.47 | 0.01 |
| Ethyl acrylate | 2-Sulfoethyl methacrylate | 0.30 | 3.20 |
| Ethyl acrylate | 2-Vinylpyridine | 0.21 | 2.25 |
| Ethyl acrylate | 4-Vinylpyridine | 0.29 | 2.58 |
| Methyl acrylate | N-Vinylcarbazole | 0.530 | 0.049 |
| Methyl acrylate | 1-Vinyl-2-methylimidazole | 1.280 | 0.050 |
| Methyl acrylate | Vinyl butyl sulfonate | 4.14 | 0 |
| Methyl acrylate | p-N,N-dimethylamino-styrene | 0.06 | 0.38 |
| Acrylonitrile | N-Vinylcarbazole | 0.390 | 0.090 |

TABLE 1-continued

Reactivity Ratio of copolymers from binary monomer system.
(Excerpt from Polymer Handbook, 3$^{rd}$ Ed. pages 153-226)

| Monomer | Monomer 2 | $r_1$ | $r_2$ |
|---|---|---|---|
| Acrylonitrile | Maleic anhydride | 6.0 | 0 |
| Acrylonitrile | N,N-divinyl aniline | 0.246 | −0.006* |
| Methacrylic Acid | Na, 2-sulfoethylmethacrylate | 0.78 | 1.20 |
| Methacrylic Acid | Styrene | 0.550 | 0.210 |
| Methacrylic Acid | Diethylaminoethylmethacrylate | 0.63 | 2.34 |
| Methacrylic Acid | Sulfolanylmethacrylate | 0.810 | 0.810 |
| Methacrylic Acid | Glycidylmethacrylate | 0.98 | 1.20 |
| Methacrylic Acid | Vinyl diethyl phosphonate | 1.90 | 0.15 |
| Methacrylic Acid | 2-Vinylpyridine | 0.58 | 1.69 |
| Methacrylic Acid | o-Chlorostyrene | 0.622 | 0.101 |
| N-Vinylpyrrolidone | 1-vinylimidazole | 0.160 | 0.960 |

*Artifact negative value considered the r value is approaching zero.

Table 1 lists the reactivity ratio values determined for some common monomers. Table 1, however, is incomplete and does not include all monomers of interest. Without experimental data, which is time consuming and difficult to collect, it is difficult to determine how two monomers will co-polymerize. There may, however, be data on how monomers of interest react with other monomers having known properties.

In accordance with aspects and embodiments, data from a single monomer may be used to produce derivative reactivity ratios of monomers of interest where reactivity data is otherwise unavailable. The derivative reactivity ratios obtained may be used to assist in the selection of monomers for the fabrication of ion exchange membranes having enhanced electrochemical properties. A derivative reactivity ratio of a monomer can be created by normalizing published reactivity data with a polymer having known properties and comparing the normalized value to the published value. For example, styrene is a very hydrophilic monomer and can be used to produce a normalized reactivity ratio that may gauge how a functional monomer or neutral monomer may react with a hydrophobic monomer, such as a cross-linking agent. Table 2 presents the styrene-normalized reactivity ratios of monomers of interest for membrane fabrication.

TABLE 2

| Monomer S | Monomer 2 | | $r_s$ | $r_2$ | $r_2/r_s$ |
|---|---|---|---|---|---|
| Styrene | p-Divinyl benzene | p-DVB | 0.26 | 1.18 | 4.54 |
| Styrene | m-Divinyl benzene | m-DVB | 0.65 | 0.60 | 0.92 |
| Styrene | 2-Hydroxyethylmethacrylate | HOEMA | 0.44 | 0.54 | 1.23 |
| Styrene | 2-Sulfoethyl methacrylate | 2-SEM | 0.37 | 0.60 | 1.62 |
| Styrene | 1-vinylimidazole | VI | 9.94 | 0.071 | 0.0007 |
| Styrene | N-vinylcarbazole | NVK | 6.0 | 0 | 0 |
| Styrene | p-chloromethylstyrene | VBC | 0.62 | 1.12 | 1.81 |
| Styrene | Acrylic Acid | AA | 0.253 | 0.136 | 0.54 |
| Styrene | methylmethacrylate | MMA | 0.49 | 0.48 | 0.98 |
| Styrene | glycidylmethacrylate | GMA | 0.54 | 0.16 | 0.30 |
| Styrene | Ethyleneglycol dimethacrylate | EGDM | 0.28 | 0.98 | 3.50 |

By comparing the styrene-normalized reactivity ratios ($r_s$) to $r_2$ of functional, cross-linking, and neutral polymers, conclusions can be drawn regarding the reactivity of the monomers. For example, if the styrene-normalized derivative reactivity ratio ($r_2/r_s$) is greater than about one, monomer 2 may have an equal tendency of reacting to another monomer and itself. If, for example, the ratio is much greater than 1, the monomer may have a much greater tendency to react with itself than with another monomer. If the ratio is less than about one, less than about 0.5, or even less than about 0.2, monomer 2 may have a greater tendency to copolymerize with another monomer than itself. Generally, the $r_2/r_s$ value of a monomer is considered a low $r_2/r_s$ value if the ratio is less than about 1.3, less than about 1.0, and more preferably, less than about 0.6.

In accordance with aspects and embodiments, a styrene-normalized derivative reactivity ratio may be used to select monomers to copolymerize for the fabrication of an ion exchange membrane and the styrene-normalized derivative reactivity ratio may further assist in optimizing the composition of the selected monomer mix.

When fabricating an ion exchange membrane with a cross-linking agent having a styrene normalized reactivity ratio higher than one, which indicates that the cross-linking agent is likely to homo-polymerize, it is important that the reaction be altered to limit homo-polymerization. By limiting or eliminating homo-polymerization, the electrochemical performance of the produced membranes may be enhanced.

Homo-polymerization may be controlled by adding additional monomers to the functional monomer-cross-linking agent mix. A monomer having an $r_2/r_s$ value of less than about one may be added to the mix to start the copolymerization of the polymer chain. Adding an additional monomer with a low $r_2/r_s$ value may facilitate the formation of alternative or random copolymers and thereby limit or eliminate homo-polymerization.

For example, 2-SEM may be used to fabricate a cation exchange membrane having sulfonic acid active sites for cation exchange. The $r_2/r_s$ value of 2-SEM is greater than one and therefore indicates a likelihood for 2-SEM to homo-polymerize. The homo-polymerized polymerization product of 2-SEM will be hydrophilic. A cross-linking monomer must be copolymerized with the 2-SEM to render the resulting membrane hydrophobic to ensure the sulfonic acid groups do not leach out of the fabricated membrane.

p-DVB and m-DVB are cross-linking agents. Though m-DVB has an $r_2/r_s$ value of less than one, which is considered a "low" $r_2/r_s$ value as the term is used herein, m-DVB is commercially only available in a mixture of m-DVB and p-DVB, and the high purity grade DVB commercially available generally comprises about 70% m-DVB and 30% p-DVB. Thus when using DVB as a cross-linking agent, DVB may have an $r_2/r_s$ value that is greater than, or much greater than one. This indicates that DVB has a high tendency to homo-polymerize and therefore less DVB should be used in the monomer mix. Some amount of DVB must be used to co-polymerize the 2-SEM, however, additional monomers, for example, neutral monomers can be added to the mix. Neutral monomers are defined herein as monomers with a styrene-normalized derivative reactivity ratio of less than about 1.3, less than about 1.0, less than about 0.5, or even less than about 0.20. The addition of a neutral monomer may facilitate the production of a more random copolymer product. Thus, by adding for example, acrylic acid (AA), which has an $r_2/r_s$ value of 0.054, the resulting cation exchange membrane fabricated from 2-SEM, DVB, and AA may have enhanced electrochemical properties as compared to a cation exchange membrane fabricated from 2-SEM and DVB in the absence of a neutral monomer.

The same principles can be applied to the fabrication of anion exchange membranes. For example, 1-vinylamidazole (VI) may be used to fabricate an anion exchange membrane having tertiary or quaternary amine groups that function as active sites for anion exchange. Based on the near zero $r_2/r_s$ value, VI is more likely to polymerize with a different monomer rather than itself. By further selecting a cross-linking monomer with a low $r_2/r_s$ value, an anion exchange membrane with excellent electrochemical properties can be achieved.

When, for example, VI is copolymerized with a cross-linking agent having an $r_2/r_s$ value that is greater than 1, such as VBC, a neutral monomer, such as HOEMA, glycidyl methacrylate, or methyl methacrylate, can be added to the monomer mix to fabricate an anion exchange membrane with superior electrochemical properties than an anion exchange membrane fabricated from VI and VBC, alone.

In the event that a high $r_2$ or a high $r_2/r_s$ crosslinking agent is selected, an additional monomer having a low $r_2$ or low $r_2/r_s$ value can be added to help achieve a higher degree of co-polymerization. In some non-limiting embodiments, monomers that may improve the resulting properties of the membrane may include hydroxyethylmethacrylate, glycidyl methacrylate, methyl methacrylate, ethyl methacrylate, butyl methacrylate, hydroxyethylacrylate, glycidyl acrylate, methyl acrylate, ethyl acrylate, butyl acrylate, acrylic acid, methacrylic acid.

In accordance with embodiments, the product of the reactivity ratio of two monomers, or the product of the styrene-normalized derivative reactivity ratio of two monomers, can be used to determine desirable membrane compositions. A product of reactivity ratios of about 1 indicates that the copolymer will be a random copolymer. A product of reactivity ratios of about 0 indicates that the resulting copolymer will be an alternative copolymer. The same principle can be applied to the product of the styrene normalized derivative reactivity ratios, $[r_2/r_s]_1$, of a first monomer and $[r_2/r_s]_2$ for a second monomer. Thus, it is most desirable to have the product of the reactivity ratios of two monomers to be near 1 or near zero, such as less than about 0.6 or in the range of between about 0.7 to about 1.3. In accordance with some embodiments, the product of the reactivity ratio of the two monomers may be less than about 0.3 or in the range of between about 0.9 to 1.1.

Other factors in addition to the reactivity ratios of monomers will affect the outcome of a copolymerization reaction. The type of initiator used, the polarity of solvents, temperature, relative humidity, the viscosity of the monomer mixture, the method of stirring during polymerization, the electron withdrawing or electron releasing nature of the pendant functional groups of the final monomer, and polarity all may affect polymerization reactions.

In accordance with aspects and embodiments, polymeric microporous substrates may be used to produce ion exchange membranes from monomer mixes. The monomer mix is selected, in part, based on the reactivity ratios, the styrene-normalized reactivity ratios, and the styrene-normalized derivative reactivity ratios of monomers. The microporous substrate may comprise polypropylene, high molecular weight polyethylene, ultrahigh molecular weight polyethylene, or polyvinylidene fluoride in some non-limiting embodiments.

The selected monomers are mixed, and in some embodiments, mixed in a solvent system. The substrate may then be wet with the monomer mix. The monomer mix may be allowed to fill the pores of the substrate, and the wet or saturated substrate may then be cast into an ion exchange membrane. The casting process used to fabricate membranes may include application of a vacuum, application of a positive pressure, application of ultraviolet radiation, heat, or any other process sufficient to solidify the mix on and in the substrate.

In accordance with one or more embodiments, a polymeric microporous substrate may comprise at least one of polypropylene, high molecular weight polyethylene, ultra-high molecular weight polyethylene, polyvinyl chloride, polyvinylidene difluoride, and polytetrafluoroethylene. A thickness of the polymeric microporous substrate may be between about 20 microns and about 255 microns. In some embodiments, it may be less than about 155 microns. In other embodiments, it may be less than about 55 microns. The resulting membrane may have a thickness that is substantially the same as the polymeric substrate.

In addition to having high permselectivity and low resistivity, ion exchange membranes should also have low water transport, also referred to herein as water loss, or internal leak. The water transport of an ion exchange membrane refers to the degree to which water can permeate through the membrane. Water loss in ion exchange membranes may reduce the amount of product produced by up to about 10%. Water loss in ion exchange membranes thus reduces the efficiency of electrochemical separation processes and increases the amount of energy, and thus the cost, of such processes.

The water loss of an ion exchange membrane may correlate to the amount of water present in the membrane. The amount of water present in the membrane may be controlled by the degree of cross-linking in the polymerized product. Cross-linking monomers may be selected to control cross-linking such that the resulting polymerization product has a lower water content and the membrane has a lower water loss.

In accordance with aspects and embodiments, an ion exchange membrane and a method of fabricating an ion exchange membrane is disclosed that may reduce internal leak as compared to commercially produced membranes.

In accordance with aspects and embodiments, methods are disclosed that may increase the purity and solubility of styrene sulfonate monomers in organic solvents. Cation exchange monomer mixes may be formulated in accordance with the methods described and may be used to fabricate a cation exchange membrane that may have a lower water loss.

When ion exchange membranes are exposed to high salinity differentials on either side of the membrane, the polymer chains may shrink. Ion exchange membranes comprising polymer chains having more flexible macrostructures can more easily change their topology and thus are more likely to shrink during use. The change in topology of the polymer chain may cause increased water transport.

For example, aliphatic acrylic based cation exchange membranes, such as membranes formed from 2-SEM monomers, are more prone to water loss during electrochemical separation processes because of aliphatic acryl chains have a flexible three dimensional macrostructure and can easily change topology in response to salinity gradients. The polymerization of methylacrylate results in the presence of undesirable aliphatic acryl chains in the ion exchange membrane that contribute to water loss.

In accordance with aspects and embodiments, a styrene sulfonate ion may be modified and used to produce a cation exchange membrane having improved electrochemical properties. Sodium styrene sulfonate generally has a low solubility, and may be less than about 10% w/v in solvent systems suitable for cross-linking monomers and therefore may not dissolve enough in a solvent system to produce a monomer mixture suitable for fabrication of a useful cation exchange membrane.

By modifying the sodium cation with a counter ion from the styrene sulfonate anion into either a hydrogen ion or a protonated pyridinum ion, a new sulfonate monomer may be produced that has increased solubility. The modified styrene sulfonate may have a solubility as high as 45-50% in NMP and may by mixed with a cross-linking agent to produce a cation exchange membrane having less water loss than cation exchange membranes fabricated from 2-SEM.

The membranes produced in accordance with aspects and embodiments of the present disclosure may advantageously be dried and re-wet, whereas generally, ion exchange membranes must remain wet. The ability of the membranes produced in accordance with aspects and embodiments to be dried enables the membranes to be coated.

In accordance with aspects and embodiments, an ion exchange membrane may be coated with a material that reduces the membrane water loss. An ion exchange material may, for example, be coated with a hydrophobic material. The coating may be a thin material that does not substantially contribute to the thickness of the ion exchange membrane. The coating may be a weak base copolymer coating or may be an organosilicate coating. In some embodiments, the weak base copolymer comprises a thermoplastic copolymer, for example, poly (2-vinylpyridine-co-styrene). In some embodiments, the organosilicate compound may comprise tetraethoxysilane, or may comprise an acryl-silanomelaminecompound. The finished coating may comprise a silano-acrylic acid.

The coating may be applied to any ion exchange membrane, and may be applied to homogenous acrylic-styrene cation exchange membranes that can be dried, re-wet, and re-used. The coated cation membranes may be fabricated from a monomer mix comprising a neutral monomer, and the neutral monomer may be, for example acrylic acid. The coated membranes may be thinner, have reduced water loss, higher permselectivity, and lower area resistivity. In contrast to aspects and embodiments of the ion exchange membranes disclosed herein, generally, ion exchange membranes must be wetted at all times. In order to apply a coating to a membrane that must remained wetted, a dynamic coating-in-place method is used. The coatings that result from these methods, however, generally wash off the membrane and the coating must be regularly reapplied. The coating applied to a wet membrane may, for example, need to be reapplied as frequently as every three months.

The membranes of the present disclosure can be dried and re-wet. This property enables the application of thinner coatings than can be achieve in dynamic-in-place coating methods. Further, the coating on the membranes of the present disclosure may more strongly adhere to the membrane surface.

In specific non-limiting embodiments, the coating may comprise about 35% tetraethoxysilane (CAS#78-10-4), about 10% 2-butoxyethanol (CAS#111-76-2), about 50% isopropanol (CAS #67-63-0) and about 5% melamine (CAS#108-78-1), or may comprise about 70% tetraethoxysilane (CAS#78-10-4), about 10% 2-butoxyethanol (CAS#111-76-2) and about 2% acrylic acid (CAS#79-10-7).

The hydrophobic coating may be diluted to obtain a thinned solution before coating an ion exchange membrane. The coating may be diluted with any appropriate solvent. The membrane may first be washed in the diluent or another solvent or solvent system before being coated with the diluted coating. Diluents may be, for example, isproponol.

The ion exchange membrane may be soaked in the diluted coating. The coated membrane may then be allowed to dry. The coating may further be dried and cured on the ion exchange membrane by exposing the coated membrane to heat, and the membrane may be hung in an oven having a temperature, for example, at about 70° C. to about 140° C.

In accordance with aspects and embodiments, the coating may be a copolymer, such a strong base copolymer or a weak base polymer. Weak base polymers include poly (2-vinylpyridine-co-styrene), poly(t-butylaminoethyl methacrylate), poly(t-butyl methacrylate-co-4-vinylpyridine), poly(dimethylamine-co-epichlorohydrin), quaternized, poly (2-vinylpyridine), linear; poly(N-vinylcarbazole). Further, other suitable copolymers may be custom synthesized for coating, such as poly(4-pyridine-co-methylmethacrylate), poly(2-ethyl-2-oxazoline), poly(vinylbenzyltrimethylammonium chloride-co-styrene); poly(trimethylammoniumethylmethacrylate-co glycidylmethacrylate), poly(trimethylammonium-ethylmethacrylate-co-methylmethacrylate), and poly(vinylbenzyltrimethylammonium chloride-co-hydroxyethylmethacrylate). A weak base copolymer may be a powder and may be dissolved in a solvent system, for example, a mixture of methanol and acetone. An ion exchange membrane may be soaked in the dissolved weak base polymer, or one or both sides may be painted with the copolymer and allowed to dry. Drying time may be in the range of about 15 minutes to several hours.

In accordance with aspects and embodiments, the thickness of the coating on the ion exchange membrane may be about less than about 1 μm, and in some embodiments, less than about 0.5 μm. The total thickness of the membrane, including the coating, may be in the range of about 20 μm to about 255 μm.

In some embodiments, a water treatment system may comprise an electrochemical separation device comprising at least one ion exchange membrane coated with a hydrophobic weak base copolymer or a hydrophobic organosilicate compound. Other potential applications of the coated membranes are incorporated herein as well.

The electrochemical characteristics of the ion exchange membranes fabricated in accordance with aspects and embodiments may be easily measured by using an electrochemical cell. The performance of ion exchange membranes, including the resistivity and permselectivity can be measured and compared using a small piece of sample in a bench top electrochemical test unit.

Figure 2:
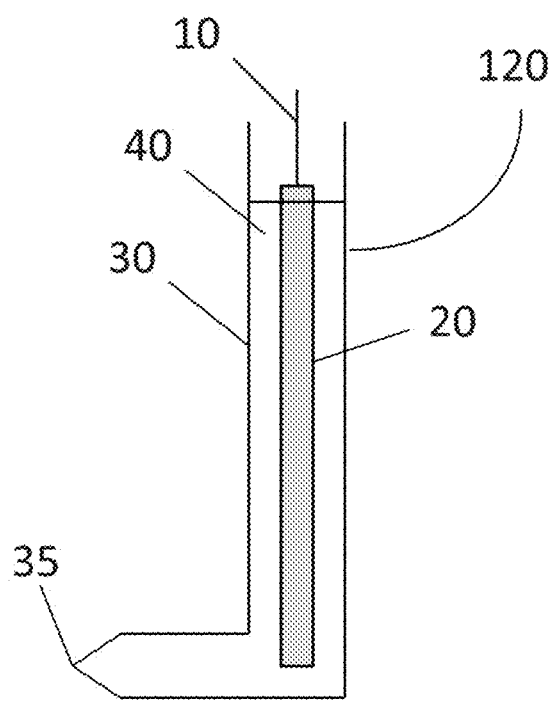
FIG. 2 presents the electrodes of the electrochemical test unit of FIG. 1.

For example and referring to FIG. 1, electrochemical test unit 100 has electrode pair 110. Electrodes 110 may be platinum disks. One electrode functions as a cathode and the other functions as an anode. Electrochemical test unit 100 has a pair of reference electrodes 120. Referring also to FIG. 2, reference electrodes 120 may comprise a silver wire 10 with a silver chloride coating 20. Wire 10 with coating 20 is disposed in glass tubing 30. Glass tubing 30 has porous tip 35 that allows electrode solution 40 to flow out of tubing 30 very slowly.

To take measurements, the cell is filled with a test solution and a current is applied to the cell. The conductivity of the test solution is calculated from the measured voltage drop between the two reference electrodes at the applied current.

A sample of an ion exchange membrane of interest is then placed between the reference electrode and the voltage drop across the membrane is measured by the reference electrodes at the applied current. The resistance of the membrane is calculated as a function of the total resistance less the solution resistance. The permselectivity is calculated as a function of the measured voltage drop, solution temperature, and concentration of the test solution on the two sides of the membrane in the cell.

Water loss of an ion exchange membrane may also be measured in a bench top experiment. A two compartment cell separated by a piece of ion exchange membrane is filled with solution and changes in volume of the solutions on either side of the cell are measured in the absence of an electrical current. When both compartments of the cell are filled with the same solution, the water loss across the cell should be zero. This initial test is used to ensure the cell is properly assembled and there are no mechanical sealing leaks.

The water loss test is then repeated by changing the salinity of the dilute and concentrate compartments and observing any volumetric changes that occur in solution volumes on either side of the membrane.

Existing electrochemical water treatment systems may be retrofitted by providing and implementing the membranes discussed herein fabricated in accordance with one or more embodiments. For example, an existing water treatment system comprising an electrochemical separation device may be retrofitted with one or more of the membrane enhancements and modifications discussed herein. The modifications and enhancements to the process of making ion exchange membranes and may be used individually, or in combination.

The improved membranes and processes of the present disclosure may be able to treat water more efficiently and with total lower capital cost than traditional water treatment systems providing and implementing the modifications discussed herein in accordance with one or more embodiments.

The function and advantages of these and other embodiments can be further understood from the examples below, which illustrate the benefits and/or advantages of the one or more systems, methods, and techniques but do not exemplify the full scope of the invention. The standard operating procedures used to fabricate ion exchange membranes and the standard operating procedures used to collect data on the resulting membranes are detailed below.

Standard Operating Procedures

Standard Ion Exchange Membrane Fabrication Procedures

Ion exchange membranes were fabricated by polymerizing various monomer solutions on polymeric microprous substrates. The microporous substrates used to fabricate the membranes of the present invention were polyethylene (PE) films, high density polyethylene (HDPE) films, ultrahigh molecular weight polyethylene (UHMWPE) films, and polypropylene (PP) films.

The substrates had a porous structure having pores in a size of from about 100 nm to about 10,000 nm and about 20% to about 90% porosity. Sandwiched polymer films with differently structured layers were investigated to accommodate different solution penetrations. Monofilament and multifilament yarns, staple yarns, woven fabrics, wet-laid, and melt spun bonded and non-bonded, non-woven fabric sheets ranging from about 100 micrometers to about 1 mm were also investigated and found to be suitable substrates. A list of preferred substrates and their properties are listed in Table 3 below.

TABLE 3

Specification of Preferred Substrates

| Abbreviation | Trade name | Manufacturer | Material | Rated pore size | Thickness microns | Porosity % |
|---|---|---|---|---|---|---|
| AP H6A | APorous lots: H6A or NS7 | APorous Billerica, MA | HDPE | 0.1 | 52 | 68 |
| TK20 | Teklon HPIP20 | Entek Lebanon, OR | UHMWPE | | 20 | 48 |
| TK32(Bi) | Teklon HPIP32Bi | Entek Lebanon, OR | UHMWPE | | 32 | 48 |
| TK32 | Teklon HPIP32 | Entek Lebanon, OR | UHMWPE | | 32 | 48 |
| S16P05A | Solupor 16P05A | Lydall Filtration Rochester NH | UHMWPE | 0.5 | 60 & 115 | 83 & 85 |
| S16P10A | Solupor 16P10A | Lydall Filtration Rochester NH | UHMWPE | 0.9 | 120 | 85 |
| EK2045 | Celgard | Celgard | UHMWPE | 0.097 | 20 | 45 |
| EZ2590 | Celgard | Celgard | PP | 0.1 | 26 | 66 |

Polymeric microporous substrates were die-cut into discs having a diameter of about 4.3 cm. Clear polyester (PET) films having a 3 mm thickness were die cut into discs having a size of about 5 cm to about 10 cm and were used as dividers between substrates to insulate the substrates from contacting air and to prevent the different substrate materials from adhering to each other during thermoset curing operations. An aluminum weighting boat having a diameter of about 10.5 cm was used to facilitate the fabrication of the membranes.

Specific monomer mixtures of interest were poured into the aluminum boat. A PET disc was placed in the boat and a piece of substrate was layered on top of the PET disc. Sufficient time was allowed for the monomer solution to wet the substrate. Air bubbles were smoothed out from the substrate completely before a second layer of PET film was placed on top of the wetted substrate.

This procedure provided for more than 10 layers of substrate sandwiched between layers of PET to be wetted in about 8 gram of monomer mixture. Alternatively, the substrates were pre-wetted in a separate container by first soaking the substrate in the monomer solution. A vacuum and mild heating at less than about 40° C. were used to degas the wetted substrates, and were used independently and in conjunction with one another with efficacy.

Polymerization of the monomer solution on the substrate was then initiated by the application of pressure and heat to form ion exchange membranes. The PET-wetted substrate layers were placed in an air-tight container and the container was filled with nitrogen gas to provide a positive pressure. Heat was then applied to the container by placing it in an oven pre-set at 80° C. The PET-substrate layers were heated for about 10 to about 30 minutes. Alternatively, polymerization was also initiated by exposure to ultraviolet light with a wavelength of about 100 nm to about 400 nm.

The monomer solution was exposed to conditions sufficient to cause the solution to solidify. After the solution was observed to have solidified, the PET-substrate layers were disassembled and the fabricated ion exchange membranes were placed in a 0.5 NaCl solution for conditioning at about 40° C. to about 50° C. for about 30 minutes to about 12 hours before their area resistivity and permselectivity were tested.

Standard Procedures for Measuring Membrane Area Resistivity and Apparent Permselectivity After membranes were fabricated in accordance with aspects and embodiments, their electrochemical properties were measured. A Solartron 1280 electrochemical measurement unit, offered by Solartron Analytics, was used to measure the apparent permselectivity and resistivity of the fabricated membranes. These values were then compared to standard, commercially available membranes.

The Solartron 1280 has the configuration of electrochemical test unit 100 shown in FIG. 1. The cylindrical path of the Solartron 1280 cell had a controlled cross sectional area of 7.0 cm². Reference electrodes 120 were platinum electrodes and were used to apply current across the cell. Reference electrodes 120 were fabricated in the lab by creating an electrochemical cell comprising a platinum wire cathode and a silver wire anode 10 filled with a 0.1 HCL solution. Current was supplied to the cell by a power supply and an ammeter. After about 10 minutes at a current of about 2-3 milliamps (mA), silver wire 10 began to turn black, indicating the formation of silver chloride layer 20 on the surface of silver wire 10. Reference electrodes 120 were newly fabricated for each experiment.

The fabricated silver/silver chloride wire was disposed in glass tubing 30 having porous tip 35. Glass tubing 30 had a diameter of about ¼ inches and was filled with 1.0 KCL electrode solution. Electrode solution was added about every 20 minutes to the electrodes to compensate for electrode solution 40 that leaked through porous tips 30 of electrodes 120.

Prior to taking measurements, the reference electrode horizontal positions were set by a pair of screws to ensure precise dimensional control between the two reference electrodes. Precise dimensional control is essential in accurately calculating resistance measurements and also ensures that the electrode tips do not damage the membrane samples. To set up the reference electrode positions, a rigid plastic disk was used in place of a membrane. The reference electrodes were positioned such that the electrode tip touched the plastic disk. Once proper placement was achieved, the reference electrodes were fixed by a pair of screws adjusted to touch against the wall of the sample slider.

The plastic disc was then removed and test solution measurements were taken in the absence of a membrane sample. The test solution was generally 0.50 NaCl. The voltage drop between and current density between the two reference electrodes was recorded at an applied current of about 10 Ma to about 50 Ma and a distance of about 1.00 cm. From these measurements, the conductivity of the solution was obtained. The solution conductivity was compared to the measurement taken by a conductivity meter to ensure accuracy.

The conductivity, C, of the solutions in the cell can be expressed as $$C = \frac{1}{\rho} = \frac{L}{RA} = \frac{L}{\frac{U}{I} \times A}$$

Where L is the distance between reference electrodes, U is the voltage measured between the electrodes at distance L, I is the current being drawn, and A is the cross-sectional area of the cell.

For example, for a 0.500M NaCl solution when 10.00 mA of current was being drawn and a voltage drop of 33.1 mV was measured across membranes, spaced 1.0 cm apart, the conductivity of the solution was:

$$C = \frac{1}{\rho} = \frac{L}{RA} = \frac{L}{\frac{U}{I} \times A} = \frac{1.00 \text{ cm}}{\frac{33.1 \text{ mV}}{10.0 \text{ mA}} \times 7.00 \text{ cm}^2} = 0.0432 \text{ S/cm}$$

After solution conductivity was measured, a sample of membrane was placed in the Solartron 1280 and the voltage and current density were again measured. The resistance of the membrane is the total resistance measured less the solution resistance measured in the absence of a membrane sample. The area resistivity, R, can thus be expressed as:

$$R = \frac{(Tr - Sr)}{I} \times A$$

Where R equals area resistivity, $T_r$ is the total measured resistivity, $S_r$ is the measured resistivity of solution, I is the measured current being drawn between the reference electrodes, and A is the area of the membrane.

For example, a standard commercially available cation exchange membrane (CXM) offered by Astom Corporation of Japan was placed in the Solartron 1280 cell and a potential of 38.0 Mv was measured across the membrane. The Solartron 1280 cross-sectional area and thus the cross sectional area of the CXM was 7.0 cm². The solution absent a membrane sample had a resistivity of 33.1 mV and a current of 10.00 mA. The CXM thus has an area resistivity of:

$$R = \frac{(38.1 - 33.1) \text{ mV}}{10.0 \text{ mA}} \times 7.00 \text{ cm}^2 = 3.42 \Omega \cdot \text{cm}^2$$

The Permselectivity of a cation (+) or anion (−) membrane, $T_\pm$ is obtained by:

$$V = (2T_\pm - 1)\frac{RT}{F} \ln \frac{a_L}{a_R}$$

Where V is the measured voltage by the reference electrodes, R is the gas constant (8.314 Joule·K⁻¹·mole⁻¹), where T is the Kelvin temperature of solution, F is Faraday's constant (96480 coulomb/mole) and $a_R$ and $a_L$ are the activities of solution on the right and left sides of the membrane, respectively. Activity, a, is a function of concentration, C:

$$a = \gamma(C);$$

Where γ is the activity coefficient of solution. The activity coefficient of the solution can be calculated using known models, such as the Debye-Hückel Equation, the Extended Debye-Hückel Equation, and the Davies Equation.

The area-resistance and apparent permselectivity of the polymeric microporous substrates were measured and compared before being used to fabricate ion exchange membranes. Polymeric microporous substrates were obtained from lithium ion battery suppliers. Teklon HPIP substrates manufactured by Entek of Lebanon Oreg., Aporous substrates manufactured by Aporous Inc. of Billeric, Mass., Celgard substrates manufactured by Celgard, LLC of Charlotte, N.C., and Solupur 16P10A substrates manufactured by Lydall Filtration of Rochester, N.H. were pre-washed using isopropanol-ethanol and deionized water each for five minutes, respectively. The substrates were then rinsed by 0.5N NaCl (aq.) four times. Discs of substrate were die cut and the area resistivity and apparent permselectivity of each substrate was measured in accordance with Solartron 1280 operating procedures above. The data recorded is presented in Table 4.

TABLE 4

Resistivity and Permselectivity of Substrates

| Substrate | R(ohm cm$^2$) | Apparent Permselectivity % |
|---|---|---|
| Teklon HPIP | 0.593 | 57.24 |
| Solupor 16P10A | 2.192 | 57.38 |
| Celgard EZ-2590 PP | 0.788 | 57.54 |
| Celgard EZ-2090 PP | 1.159 | 57.38 |

Standard Operating Procedures of Osmotic Water Loss Tests

A two compartment cell was assembled using one ion exchange membrane positioned between 2 screen spacers. The concentrate and dilute compartments had dimensions of 18.54 cm×3.18 cm×0.05 cm. A first container was arranged in fluid communication with the dilute compartment and a second container was arranged in fluid communication with the concentrate compartment. The container arranged in communication with the dilute compartment was placed on top of a digital balance such that any changed in volume in the dilute compartment could be measured by changes in volume in the container.

The cell was first tested to make sure that there were no mechanical sealing issues with the assembly. A piece of fabricated membrane was inserted in the cell and both compartments were fed with a sodium chloride solution have 35,000 ppm. Because both compartments were fed with solution having the same salinity, no water loss should have been observed. If water loss was observed, the assembly was reinserted in the cell or replaced to ensure that no water loss was observed.

The dilute compartment was then fed with a lower salinity concentration while the solution in the concentrate compartment was kept at a salinity of 35,000 ppm. The dilute compartment was fed with a sodium chloride solution have 30,000 ppm, 25,000 ppm, 20,000 ppm, 15,000 ppm, 10,000 ppm, 5000 ppm, 1000 ppm, and 500 ppm. The weight change experienced in the dilute container was measured for each solution. Readings were taken about every 20 minutes for about two hours and the weight change was plotted against time.

The rate of osmotic water loss, expressed in gm/(m$^2$ hr), was calculated from the water transport rate and the total effective membrane area. The osmotic water loss coefficient, express in gm/(m$^2$ hr Bar) was calculated from the osmotic water transport rate, total effective membrane area, and osmotic pressure difference between the dilute and concentrated streams. The water loss experienced by the membranes were observed by plotting the water loss coefficient against the difference in salinity.

EXAMPLES

Cation exchange membranes were fabricated in accordance with aspects and embodiments to test the improvement in electrochemical properties of cation exchange membranes fabricated from processes disclosed herein. Solutions having different monomer mixes were cast on microporous polymeric substrates and allowed to fill the pores of the substrate. As used herein, monomer mix and monomer solution are used interchangeably. An ion exchange membrane comprising a cation transferring polymeric layer was then formed from the wet, pore-filled, substrate. The area-resistivity and apparent permselectivity of resulting cation exchange membranes were then measured and the values were compared to the measured area resistivity and apparent permselectivy of a commercially available cation exchange membrane (CMX) offered by the Astom Corporation of Japan. The CMX membrane had a thickness of about 170 μm.

Example 1

CEM Formulation Based on 2-SEM/DVB/EGDM/AA

The effect of monomer composition on resulting membranes was investigated by adding a monomer having a low $r_2/r_s$ value to a system having a cation functional monomer and cross-linking agents having $r_2/r_s$ values greater than one. A five ounce jar immersed in an ice water bath having a temperature of about 5° C. was charged with a solvent system of 25.8 g NMP and 25.8 gm of 1-butanol. 165.7 gm of 2-SEM, 11.05 gm of DVB (80% m-DVB, 20% p-DVB), 44.95 gm of EGDM and 3.675 gm of AA were added to the solvent system and stirred to get a homogenous dark red, wine colored, clear solution. 1.87 gm of 2,2'-dimethyl-2, 2'azodipiopiononitrile (Vazo® 64 produced by DuPont™) was added to the mix to initiate free radical polymerization. The Vazo® 64 was stirred until dissolved. Six, 11 inch×16 inch, 20 μm Teklon HPIP substrates were soaked in the solution for 80 minutes. The substrates were sandwiched between polyester (Mylar) sheets and air bubbles were removed from the soaked substrates. The assembly was rolled onto a hollow PP tube having a diameter of 1.2 inches. The rolled assembly was placed in an airtight container, filled with nitrogen gas, and placed vertically in an 80° C. oven for 2 hours. The fabricated membranes were then removed from the assembly and soaked in a 1 liter glass graduated cylinder containing an isopropanol-water mixture. The membranes were dried in a hood over night and then conditioned in 0.5 N NaCl (aq). The area resistance and permselectivity of the fabricated membranes is presented in Table 5.

TABLE 5

Data on CEM based on 2-SEM/DVB/EGDM/AA

| Description | R(ohm cm$^2$) | Apparent Permselectivity % |
|---|---|---|
| CMX | 2.91 | 105.3 |
| Teklon HPIP 20 μm mono layer (Example 1) | 1.70 | 104.7 |

The resulting membranes had improved apparent permselectivity, were thinner, and had and lower area resistance than the Astom CMX. The addition of acrylic acid (AA)

significantly reduced the area resistivity of the resulting membranes. As indicated by the improved electrochemical properties of the resulting membranes, the addition of acrylic, which has an $r_2/r_s$ of 0.54, to the monomer mix enhanced the reactivity of 2-SEM, which resulted in a more fully copolymerized product.

Cation exchange membranes based on 2-SEM were then coated with various hydrophobic coatings to investigate the coating's impact on reducing water loss.

Example 2

A hydrophobic coating designed to prevent rust from developing on surface nails was obtained from Nanomate Technology Co., LTF in Kaohsiung, Taiwan. The coating, Nanomate® 1800, contained about 70% tetraethoxysilane (CAS#78-10-4), about 10% 2-butoxyethanol (CAS#111-76-2) and about 2% acrylic acid (CAS#79-10-7).

Example 2A

Diluted Nanomate® 8100 Coating

The coating was first heated before being applied to the membranes. 6.88 gm of coating were placed in a 40 ml vial and heated in an 80° C. over for 17 hours.

1.75 gm of the heat cured coating was diluted with 250 gm of isopropanol and poured into a 500 ml glass graduated cylinder. A membrane from Example 1 was soaked in the solution for 30 minutes. The wet membrane was then hung in a 100° C. over vertically for 15.5 hours. The membrane was the conditioned in a 0.5 N NaCl.

Example 2B

Further Diluted Nanomate® 8100 Coating

The diluted coating solution of Example 2A was further diluted with an additional 500 gm of isopropal. A membrane from Example 1 was soaked in the solution for 30 minutes. The wet membrane was then hung in a 100° C. over vertically for 15.5 hours. The membrane was the conditioned in a 0.5 N NaCl.

Example 2C

Weak Base Copolymer Coating

Weak base copolymers were then investigated for their ability to coat membranes to reduce water loss. Poly(2-vinylpyridine-co-styrene) was obtained in powdered form and dissolved. 0.2205 gm of copolymer powder was placed in a 40 ml vial and a solvent system of 20.3045 gm of methanol and 8.600 gm acetone was added. The vial was sealed and placed in an over for 80° C. for 210 minutes to dissolve the polymer. One side of a membrane from Example 1 was brushed with the dissolved copolymer solution and allowed to air dry in a hood. The membrane was then conditioned in a 0.5 N NaCl.

Three discs were cut from each of the coated membranes of Examples 2A-2C and the electrochemical properties of the coated membranes were measured and compared to the Astom CMX. The data is presented in Table 6.

TABLE 6

| Description | R (ohm cm$^2$) | Apparent Permselectivity % |
| --- | --- | --- |
| CEM coated nanomate 8100 #1 (Example 2B) | 4.40 | 106.3 |
| CEM coated nanomate 8100 #2 (Example 2B | 3.78 | 106.3 |
| CEM coated nanomate 8100 #3 (Example 2B) | 4.12 | 106.4 |
| CEM coated nanomate 8100 #X (Example 2A) | 4.11 | 106.6 |
| CEM coated nanomate 8100 #Y (Example 2A) | 5.69 | 106.1 |
| CEM coated nanomate 8100 #Z (Example 2A') | 4.95 | 106.6 |
| CEM coated Poly(sty-co-vinylpyridine) #A (Example 2C) | 3.00 | 104.9 |
| CEM coated Poly(sty-co-vinylpyridine) #B (Example 2C) | 2.00 | 104.4 |
| CEM coated Poly(sty-co-vinylpyridine) #C (Example 2C) | 2.13 | 105.1 |
| Astom CMX | 3.23 | 105.0 |

Example 3

Figure 3:
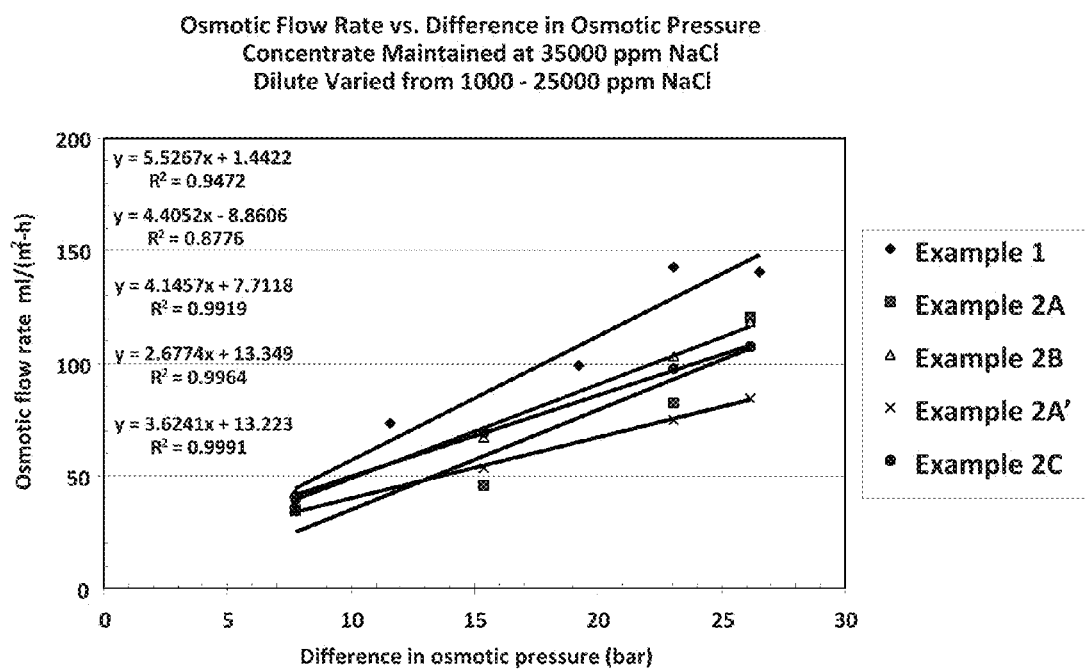
FIG. 3 presents data described in accompanying Example 3.

The membrane discs of Example 2 were then subject to a water loss test. This data is presented in FIG. 3. An uncoated cation exchange membrane fabricated in accordance with Example 1 was used as a benchmark to compare the efficacy of the coating. Water loss data was collected for membranes from Examples 2A, 2A', 2B, and 2C. The coatings of Examples 2A-C reduced osmotic water loss. In the case of Example 2A, water loss was reduced by about 50% as compared to the uncoated membrane (Example 1) at about 23 bar differential osmotic pressure. Similarly, in Example 2C, osmotic water loss was reduced by about a 35%. The data indicated that both thermoplastic and weak base coatings reduced osmotic water loss as compared to uncoated, comparable, CEMs. The coated membranes of the present invention may improve the process efficiency of electrochemical separation applications.

The phraseology and terminology used herein is for the purpose of description and should not be regarded as limiting. Any references to embodiments or elements or acts of the apparatus and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. Any references to positional or spatial orientation are intended for convenience of description, not to limit the present apparatus and methods or their components.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

The invention claimed is:

1. An ion exchange membrane, comprising:
   a polymeric microporous substrate;
   a cross-linked ion transferring polymeric layer on the substrate; and
   a hydrophobic coating on the cross-linked ion transferring polymer, the hydrophobic coating comprising at least one of a weak base copolymer and an organosilicate compound.

2. The ion exchange membrane of claim 1, wherein the membrane comprises a total thickness of about 20 μm to about 255 μm.

3. The ion exchange membrane of claim 2, wherein the cross-linked ion transferring polymer is a cross-linked cation transfer polymer.

4. The ion exchange membrane of claim 2, wherein the microporous support comprises polypropylene, high molecular weight polyethylene, ultrahigh molecular weight polyethylene, or polyvinylidene fluoride.

5. The ion exchange membrane of claim 3, wherein the cross-linked ion transferring polymer comprises the polymerization product of 2-sulfoethylmethacrylate and a cross-linking monomer.

6. The ion exchange membrane of claim 5, wherein the cross-linking monomer comprises at least one of ethyleneglycol-dimethacrylate, m-divinylbenzene, and a mixture of m-divinylbenzene and p-divinylbenzene.

7. The ion exchange membrane of claim 3, wherein the cross-linked ion transferring polymer comprises the polymerization product of 2-sulfoethylmethacrylate, a low value $r_2/r_8$ monomer, and a cross-linking monomer.

8. The ion exchange membrane of claim 7, wherein the cross-linking monomer comprises at least one of ethyleneglycol-dimethacrylate, m-divinylbenzene, and a mixture of m-divinylbenzene and p-divinylbenzene.

9. The ion exchange membrane of claim 7, wherein the low value $r_2/r_8$ monomer has an $r_2/r_8$ value of less than about 1.3.

10. The ion exchange membrane of claim 7, wherein the low value $r_2/r_8$ monomer is acrylic acid or methacrylic acid, glycidyl methacrylate, methylmethacrylate, or styrene.

11. The ion exchange membrane of claim 1, wherein the weak base copolymer comprises a thermoplastic copolymer.

12. The ion exchange membrane of claim 11, wherein the thermoplastic copolymer comprises poly (2-vinylpyridine-co-styrene).

13. The ion exchange membrane of claim 1, wherein the organosilicate compound comprises tetraethoxysilane.

14. The ion exchange membrane of claim 1, wherein the membrane has an apparent permselectivity of greater than about 95%.

15. The ion exchange membrane of claim 1, wherein the membrane has a resistivity of less than about 1.5 Ohm-cm$^2$.

16. A method of reducing water loss in an electrochemical separation device comprising at least one ion exchange membrane, the method comprising:
coating the at least one ion exchange membrane with a hydrophobic weak base copolymer or a hydrophobic organosilicate compound; and
integrating the at least one coated ion exchange membrane into the electrochemical separation device.

17. The method of claim 16, wherein the weak base copolymer comprises a thermoplastic copolymer.

18. A water treatment system, comprising:
an electrochemical separation device comprising at least one ion exchange membrane coated with a hydrophobic weak base copolymer or a hydrophobic organosilicate compound.

19. The water treatment system of claim 18, wherein the weak base copolymer comprises poly (2-vinylpyridine-co-styrene).

20. The water treatment system of claim 18, wherein the organosilicate compound comprises an acryl-silano-melamine compound.

* * * * *